Figure 1:
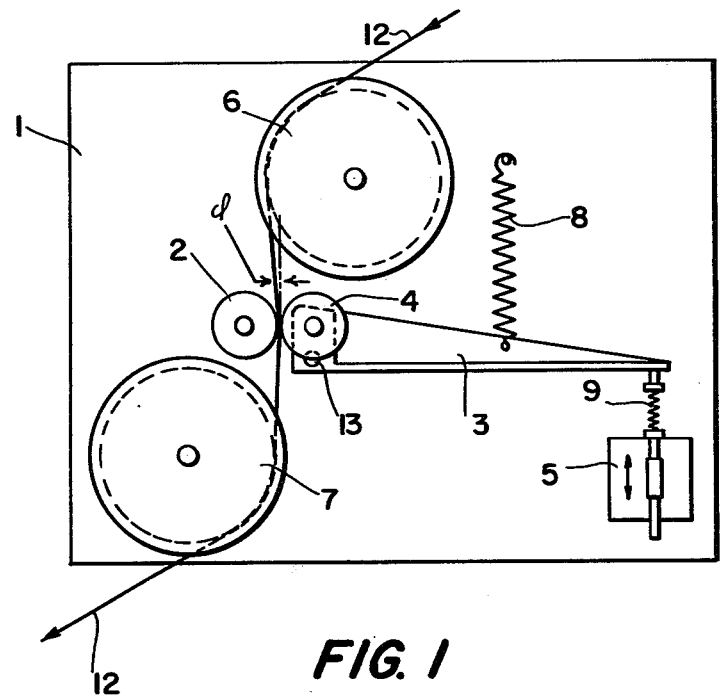

United States Patent [19]

Dussel

[11] 4,197,651
[45] Apr. 15, 1980

[54] CONTINUOUS TESTING OF THE THICKNESS OF THE ENAMEL COATING OF ELECTRIC WIRES

[75] Inventor: Wilhelm Dussel, Ludwigshafen, Fed. Rep. of Germany

[73] Assignee: BASF Aktiengesellschaft, Ludwigshafen, Fed. Rep. of Germany

[21] Appl. No.: 884,004

[22] Filed: Mar. 6, 1978

[30] Foreign Application Priority Data

Mar. 28, 1977 [DE] Fed. Rep. of Germany ....... 2713576

[51] Int. Cl.$^2$ ............................................... G01B 7/06
[52] U.S. Cl. ................................ 33/143 L; 33/147 L; 33/149 J
[58] Field of Search ............ 33/143 L, 143 R, 147 L, 33/147 N, 148 H, 149 J, 169 F

[56] References Cited

U.S. PATENT DOCUMENTS

| | | | |
|---|---|---|---|
| 1,815,710 | 7/1931 | Guillemin | 33/148 H |
| 3,190,261 | 6/1965 | Ziffer | 33/147 L |
| 3,880,000 | 4/1975 | Burns | 33/147 L |

Primary Examiner—Willis Little
Attorney, Agent, or Firm—Keil & Witherspoon

[57] ABSTRACT

A process for continuously testing the thickness of the enamel coating of electric wires, in which the wire, after enamelling, passes between a fixed and a movable measuring roller. The wire is wrapped around the fixed measuring roller such that its wrap-around angle has a value between 0 and 15 degrees and the fixed and movable measuring rollers are positioned relative to each other such that their respective planes of symmetry are vertically displaced by a value between 0.5 and 2 mm. Using the process according to the invention, the thickness of enamel applied to the wire can be kept constant to about 0.5 μm.

3 Claims, 2 Drawing Figures

CONTINUOUS TESTING OF THE THICKNESS OF THE ENAMEL COATING OF ELECTRIC WIRES

The present invention relates to a process for continuously measuring the diameter of a wire, for example for testing the thickness of the enamel coating of an electric wire.

In conventional wire enamelling units, the thickness of the enamel coating of the wires is determined by means of micrometers or sensors with dial gauges. Precise determination of the thickness of the enamel can thus only be carried out on the finished wire bobbins. Wires of diameter $0.1 \leq d \leq 0.3$ mm are coated at wire speeds of up to 200 m/min. At these speeds, it is no longer possible to measure the thickness of the enamel during the coating process. When determining the thickness, no substantial additional tension is allowed to be exerted on the enamelled wire, to avoid stretching the wire. Contactless measurement of the diameter of filaments has been disclosed. However, such methods are not applicable to wire enamelling, since the enamelled copper wire is wavy and cannot be pulled absolutely straight without additional tension, which causes faults in the enamelling.

Accordingly, testing the thickness of the enamel coating of electric wires, and checking the enamel for coating faults, has hitherto only been carried out on the finished wires, after they have been enamelled. However, for quality control purposes it is necessary that the thickness of the coating, and the coating faults, of the finished wire present on a bobbin should be known. It is an object of the present invention to enable fluctuations in thickness of a wire, e.g. an enamel coated wire, to be sensed directly during manufacture, so that the thickness of the wire can be maintained constant to within $\pm 1$ $\mu$m. In particular, to avoid waste in an enamelling process, it should furthermore be possible to switch off the enamelling unit if the wire should tear during enamelling.

I have found that this is achieved, according to the invention, if the wire, after enamelling, passes between a fixed and a movable measuring roller, in such a way that the wrap-round angle $\phi$ of the wire over the fixed measuring roller is such that $0 \leq \phi \leq 15°$, preferably $1 \leq \phi \leq 5°$, the plane of symmetry which is perpendicular to the axis of the fixed measuring roller is shifted, by an amount h, where $0.5 \leq h \leq 2$ mm, preferably $1 \leq h \leq 1.5$ mm, relative to, and parallel to, the plane of symmetry which is perpendicular to the axis of the movable measuring roller, the wire is fed in over an inlet roller which is upstream from the measuring rollers and is removed via an outlet roller which is downstream from the measuring rollers, and the movable measuring roller is carried on a lever by means of which the movement of the said measuring roller is transmitted to a measurement indicator.

The two measuring rollers are electrically insulated from their holder and a test voltage is applied to the measuring rollers so that flaws in the enamelling of the wire passing through are indicated by a current flowing, which actuates a counter or a recorder. Using a time-delay device, in the event of the wire tearing, the current flowing causes the coating unit to be switched off. If an inductive or capacitive transducer is used, this signal regulates the metering pumps for the feed of enamel to the enamelling felt, or, in the case of roller enamelling, regulates the electric motor which drives the enamelling roller, so that the thickness of enamel coating applied to the wire is kept constant to within 0.5 $\mu$m.

Figure 2:
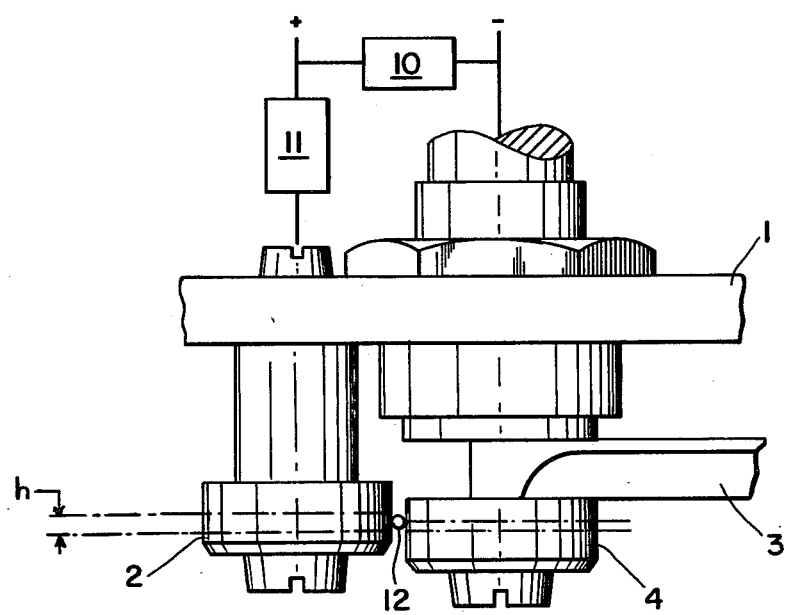

The invention will now be described, by way of example, with reference to the accompanying drawings, in which:

FIG. 1 is a plan of an apparatus for continuously measuring the diameter of a wire, and FIG. 2 is a side view of a detail of the apparatus shown in FIG. 1.

A measuring device for carrying out the process according to the invention comprises a rotatable measuring roller 2 carried in ball bearings, and fixedly mounted on a base plate 1. A transmission lever 3, to which is fixed a further rotatable measuring roller 4 carried in ball bearings, is pivotally mounted at 13 on the base plate 1 so that the roller can rotate easily. The transmission lever 3 transmits the movement of the measuring roller 4 in an amplified form to a transducer 5, by means of which the mechanical deflections of the measuring roller 4, due to any fluctuations in thickness of the enamel coating of a wire 12, are converted to electrical signals. The wire 12 (typically of copper and having a diameter of from 0.1 mm to 0.3 mm) which is to be measured first encounters a guide roller 6 and then passes over the measuring roller 2 with a wrap-round angle $\phi$ of $1 \leq \phi \leq 5°$. The wire 12 is then fed to the winder via a further guide roller 7 mounted on the base plate 1. A characteristic feature of the measuring device according to the invention is that the median plane of the rolling surface of the measuring roller 2 is spaced relative to the median plane of the rolling surface of the measuring roller 4 (which is mounted on the transmission lever 3), and parallel thereto, by an amount h, where $0.5 \leq h \leq 5$ mm. The contact pressure between the two measuring rollers 2 and 4 can be set, by means of coil springs 8 and 9, to be such that the wire 12 is not stretched.

The base plate 1 is made from an electrically insulating plastics material, for example a glass fiber-reinforced polyester, and a test voltage of 100 volts is applied to the electrically conducting measuring rollers 2 and 4. Flaws on the wire 12 can then be determined by means of a pulse counter 10. If the wire 12 tears, the measuring rollers 2 and 4 make contact and a current flows through a time-delay device 11. This can be used to trigger a relay which switches off the coating unit if the wire has torn. Using conventional electronic components, it is possible, via the transducer 5, to regulate, e.g. automatically, the thickness of the enamel coating applied to the electric wire or to indicate non-uniform covering of the enamel on the wire.

EXAMPLE

An inductive pick-up was used as the transducer 5; using a wire of 0.14 mm diameter, the zero point of the coating thickness was adjusted by displacement of the transducer. A pen recorder was connected via an amplifier to the inductive transducer in such a way that the maximum pen excursion corresponded to 50 $\mu$m. The wire was then enamelled in the conventional manner with a synthetic resin baking enamel. At regular intervals of 2 hours over a period of 144 hours, the thickness of the enamel coating was measured by means of a mechanical caliper device. Over this period, with an intended thickness of coating of 12 $\mu$m, the following results were obtained:

Caliper measurement: $12 \pm 1.2$ $\mu$m

Continuous measurement: 12±1.3 μm.

Unsatisfactory levelling of the enamel on the wire showed up as a very pronounced broadening of the pen trace.

I claim:

1. A process for continuously testing the thickness of enamel coating on electrical wires in which a device is utilized in conjunction with the coating unit which has an inlet roller, fixed and movable measuring rollers located downstream from the inlet roller and an outlet roller located downstream from the measuring rollers, said process comprising the steps:

feeding the wire into the device over said inlet roller and between said measuring rollers;

Passing the wire around over said fixed measuring roller between said inlet and outlet rollers such that the wire is deflected over said roller and has a wrap-round angel $\phi$ with a value of $0 \leq \phi \leq 15°$, and preferably of $1 \leq \phi \leq 5°$;

positioning the fixed and movable measuring rollers relative to each other such that the plane of symmetry which is perpendicular to the axis of said fixed measuring roller is vertically displaced by an amount h relative to and parallel to the corresponding plane of symmetry of the movable measuring roller, where the valve of h is $0.5 \leq h \leq 2$ mm, and preferably $1 \leq h \leq 1.5$ mm;

pivoting said movable measuring roller on a lever by means of which the movement of said measuring roller away from said fixed measuring roller is transmitted to a measurement indicator; and removing said wire from the device over said outlet roller.

2. The process of claim 1 further comprising applying a test voltage to said measuring rollers which are electrically, insulated from one another in a manner such that any flaws in the enameling of the wire passing therebetween will be indicated by current flowing between said measuring rollers thereby actuating a recording means.

3. The process of claim 2 further comprising activating a time-delay device in the event of said wire tearing by means of said current flowing between said measuring rollers thereby causing the coating unit to be switched off.

* * * * *

UNITED STATES PATENT AND TRADEMARK OFFICE
CERTIFICATE OF CORRECTION

PATENT NO. : 4,197,651
DATED : April 15, 1980
INVENTOR(S) : WILHELM DUSSEL

It is certified that error appears in the above-identified patent and that said Letters Patent are hereby corrected as shown below:

Column 3, line 15: Delete "around" .

" ", " 18: "angel" should be -- angle -- .

Signed and Sealed this

Twenty-ninth Day of July 1980

[SEAL]

Attest:

SIDNEY A. DIAMOND

Attesting Officer     Commissioner of Patents and Trademarks

UNITED STATES PATENT AND TRADEMARK OFFICE
CERTIFICATE OF CORRECTION

PATENT NO. : 4,197,651

DATED : April 15, 1980

INVENTOR(S) : WILHELM DUSSEL

It is certified that error appears in the above-identified patent and that said Letters Patent are hereby corrected as shown below:

Column 3, line 15:   Delete "around".

Column 3, line 18:   "angel" should be -- angle --.

Column 4, line 4:    "valve" should be -- value --.

THIS CERTIFICATE SUPERSEDES CERTIFICATE OF CORRECTION ISSUED July 29, 1980.

Signed and Sealed this

Twenty-eighth Day of October 1980

[SEAL]

Attest:

SIDNEY A. DIAMOND

Attesting Officer

Commissioner of Patents and Trademarks